United States Patent [19]
Khurgin

[11] Patent Number: 4,873,510
[45] Date of Patent: Oct. 10, 1989

[54] ICE DETECTOR WITH MOVABLE FEELER

[76] Inventor: Boris Khurgin, 175 W. 87th St., New York, N.Y. 10024

[21] Appl. No.: 184,361

[22] Filed: Apr. 21, 1988

[51] Int. Cl.$^4$ ............................................. G08B 19/02
[52] U.S. Cl. .................................................. 340/580
[58] Field of Search ..................... 340/580; 244/135 F

[56] References Cited

U.S. PATENT DOCUMENTS

| | | | |
|---|---|---|---|
| 2,427,778 | 9/1947 | Gregg | 244/134 F |
| 2,494,877 | 1/1950 | Idrac | 340/580 |
| 2,803,813 | 8/1957 | Bullen et al. | 340/580 |
| 3,134,563 | 5/1964 | Stuetzer | 340/580 |
| 3,540,025 | 11/1970 | Levin et al. | 244/134 F |
| 4,054,255 | 10/1977 | Magenheim | 340/580 |
| 4,497,181 | 2/1985 | Kocher et al. | 340/580 |
| 4,551,982 | 11/1985 | Kocher et al. | 340/580 |
| 4,646,068 | 2/1987 | Skala | 40/580 |
| 4,766,369 | 8/1988 | Weinstein | 340/580 |

Primary Examiner—Glen R. Swann, III
Attorney, Agent, or Firm—James & Franklin

[57] ABSTRACT

An ice detector comprises a housing from which a feeler is adapted to be projected through an aperture—if ice does not cover the aperture the feeler moves freely to its projected position, but if ice does cover the aperture the feeler does not so move. The movement or non-movement of the feeler actuates an appropriate alarm. The feeler may be moved by an expansible chamber so mounted within a housing that expansion of the chamber when heated moves the feeler out of the housing when no ice is present, while when ice is present that expansion actuates the ice detector alarm.

13 Claims, 2 Drawing Sheets

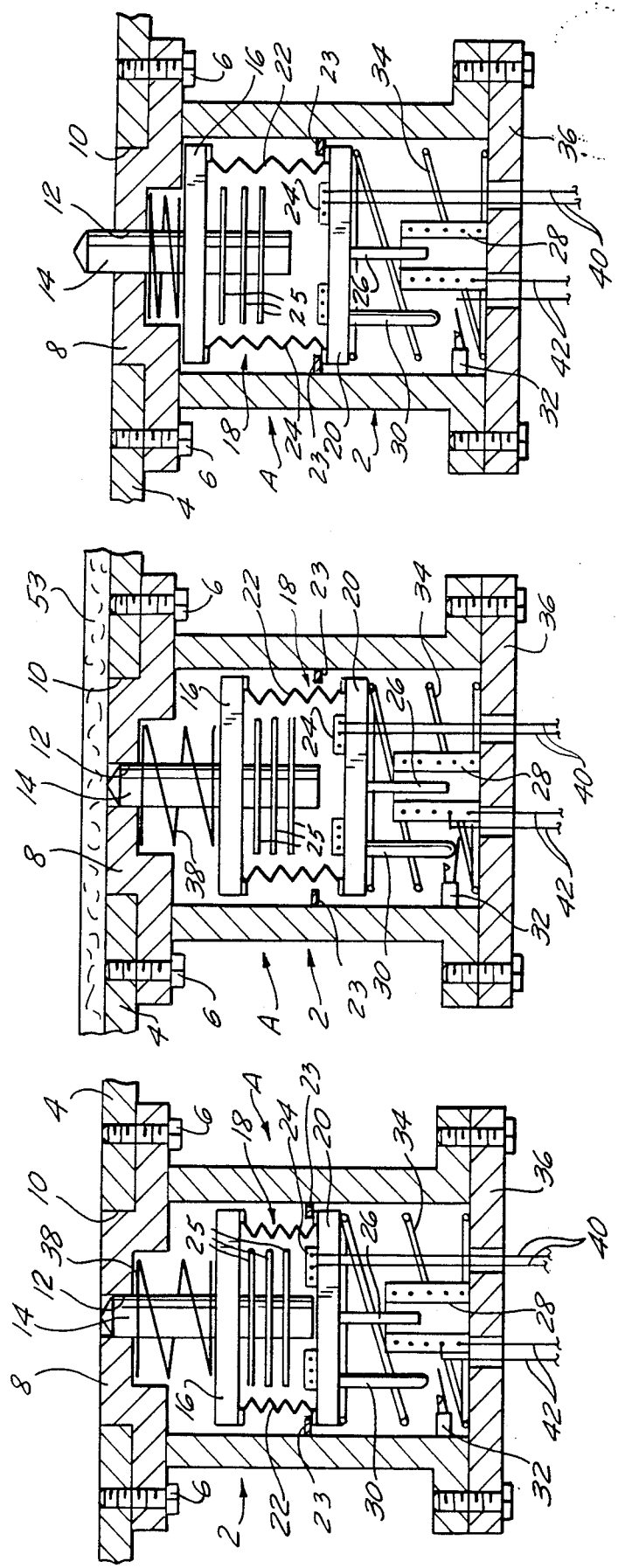

ICE DETECTOR WITH MOVABLE FEELER

This invention relates to means for indicating the presence or absence of ice on a surface.

BACKGROUND OF THE INVENTION

There are many instances when it is important to know whether, or to what extent, ice has formed on a given surface. The presence of ice on the wings, control surfaces or fuselage of aircraft is known to be potentially life threatening, but there are many other instances (e.g., cooling towers, aerials, refrigerator elements, bridges and roadways and the like) where ice detection is also important. While various proposals have been made in the past for devices capable of detecting ice formation and indicating when ice has formed to an impermissible degree, in general those prior art devices suffer from complexity, expensiveness and unreliability. In many instances they are also undesirable for use with aircraft because they normally project out from the aircraft surface where ice detection is to take place and therefore disturb the aerodynamic efficiency of the craft. For example, the device disclosed in Bullen et al. U.S. Pat. No. 2,803,813 of Aug. 20, 1957 utilizes an element which normally projects beyond the aircraft surface so that if icing conditions prevail ice can form on that object, as a result of which when the object is pulled back into the aircraft its retrograde motion will be impeded by the ice and thus will cause a part within the housing to move and actuate an alarm. In addition to the fact that the part must project out from the airplane for an appreciable period of time in order to give ice the opportunity to form on it if weather conditions are appropriate, the presence of foreign particles other than ice on the exterior of the object will cause false alarms, thus making it unreliable.

SUMMARY OF THE INVENTION

My ice detector has a part which is adapted to be projected out beyond the surface on which the presence or absence of ice is to be detected, but it thus projects out, if at all, only during the limited period of time that a test for ice is carried out. Those tests may be periodically made at a time frequency appropriate to the external conditions. For example, tests may be made only upon command, or once a minute or once every 10 minutes or, if the situation is potentially critical, every 15 seconds, and each test will involve an element projecting from the skin of the aircraft for only a few seconds at a time. Moreover, the device of the present invention can be readily designed to give an alarm only when a significant amount of ice has formed.

It is the prime object of the present invention to devise an ice detector which is inexpensive, positive and reliable in operation, and adaptable to many different requirements.

It is a further object of the present invention to devise such an ice detector which performs its act of detection quickly and positively and then resumes a standby condition, ready to perform that act of detection at any desired later time, but without interfering with the equipment with which it is associated except during the brief intervals that it is acting to detect ice.

It is yet another object of the present invention to provide an ice detector adaptable to detect different degrees of ice formation.

To these ends the ice detector of the present invention comprises a feeler within a housing and projected out from that housing through an appropriately positioned aperture in a wall thereof. The apertured housing wall is located on, and preferably constitutes a continuation of, the surface on which the presence or absence of ice is to be detected, e.g., the skin of an aircraft. Means are provided for urging the feeler to project outwardly from the housing, that means preferably comprising a selectively electrically energizable element such as a solenoid or a heat-expansible member. The force with which the feeler is thus urged outwardly to its projecting position can be varied by varying the energization of the solenoid, heater or other feeler-activating means. If ice has formed over the aperture through which the feeler is to pass movement of the feeler through that aperture will tend to be restricted, and if the ice layer is thick enough to resist the projecting force exerted on the feeler movement of the feeler to its projected position will be prevented. Means are provided to sense the position of the feeler after it has been urged to its projected position; if the feeler has not moved to its projected position, thus indicating the existence of ice over the aperture of a thickness sufficient to overcome the projecting force, an alarm will be actuated to indicate the presence of ice. The device will then be deactivated, the feeler will return to its normal retracted position if it is not already in that position, and it will then be ready for a new ice test whenever desired.

BRIEF DESCRIPTION OF THE DRAWINGS

To the accomplishment of the above, and to such other objects as may hereafter appear, the present invention relates to the construction and operation of an ice detector as defined in the appended claims and as described in this specification, taken together with the accompany drawings, in which:

FIGS. 2, 3 and 4 are cross-sectional views, all taken along the lines 2—2 of FIG. 1, of a preferred embodiment of the present invention showing the device respectively in its standby unactuated condition, its actuated condition when ice is present and detected, and its actuated condition when there is no ice to be detected;

DESCRIPTION OF THE PREFERRED EMBODIMENTS

Figure 1:
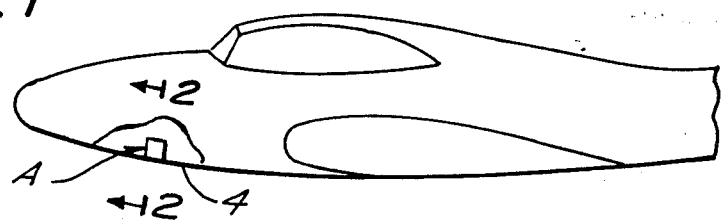
FIG. 1 is an idealized view showing one application for the ice detector of the present invention, to wit, to detect the presence of ice on the skin of an aircraft.

While I have here chosen to illustrate the device of the present invention as used to detect ice on the skin of an aircraft (the device generally designated A in FIG. 1 being mounted inside an aircraft adjacent to the skin thereof), that being a very important application for the detector of the present invention, it will be understood that is by way of illustration only, and that my ice detector can be used in many other environments where detection of the presence or absence of ice is called for.

Figure 5:
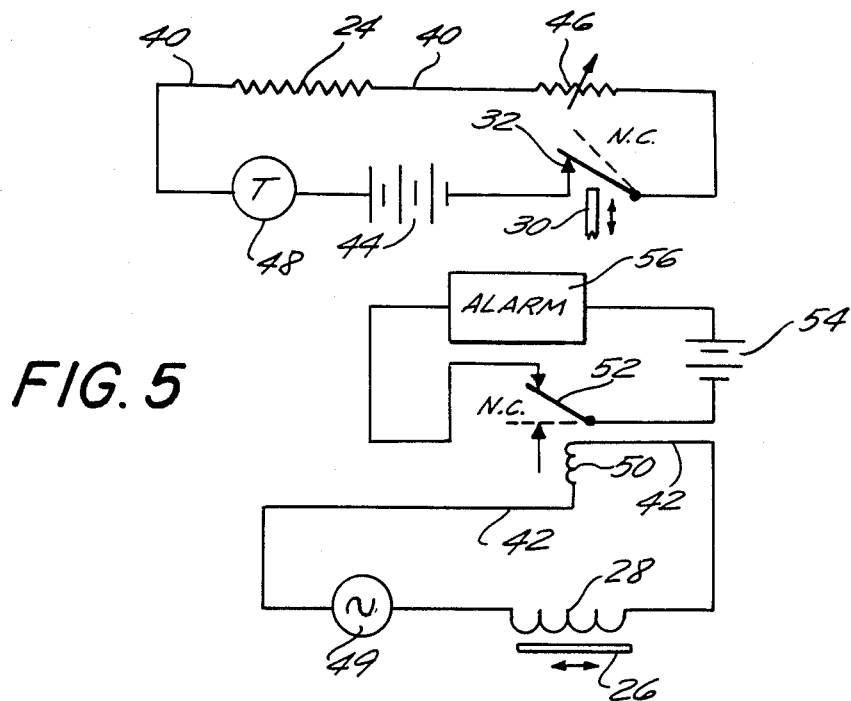
FIG. 5 is a simplified diagram of the electrical circuitry of the embodiment in FIGS. 2-4.

In FIGS. 2, 3 and 4, illustrating a preferred embodiment of the present invention, the ice detector A comprises a housing generally designated 2 secured to the inside of a mounting structure 4, such as the skin of the aircraft, by screws 6 so as to have its forward wall 8 extend snugly into an opening 10 in the skin of the structure 4, preferably so as to be flush with the outer surface of that skin. The forward wall 8 is provided with an aperture 12 through which a feeler rod 14 snugly passes. That feeler rod 14 is rigidly connected to the top wall 16 of a gas- or liquid-filled expansible chamber 18 which comprises a bottom wall 20 and a bellows-like connection 22 between the walls 16 and 20. The liquid, when used, should be one having a large enough temperature coefficient of expansion to produce the desired expansion of the chamber 18. Liquids of this type are well-known, and are often used in existing thermostats. Located within the chamber 18 is an electric heater 24. Extending down from the bottom wall 20 is a control rod 26 which cooperates with a position sensor which is electrical in nature and which is here disclosed as a coil 28 through which the rod 26 is designed to telescope, whereby to alter the inductance of that coil. Also depending from the wall 20 is a finger 30 designed to cooperate with a normally closed switch 32. A coil spring 34 is positioned between the chamber wall 20 and the bottom wall 36 of the housing and another coil spring 38 is positioned between the chamber wall 16 and the upper wall 8 of the housing. Stops 23 limit the upward movement of wall 20 as urged by spring 34. Wires 40 and 42 from the heater 24 and the coil 28 respectively extend from the housing to appropriate electrical circuitry such as that shown in FIG. 5. The heater 24 is connected in series with a battery 44, the switch 32, a variable resistor 46 and a timer 48. The coil 28 is connected in series with a source 49 of alternating voltage and the actuating coil 50 of a normally closed switch 52 in series between a battery 54 and a suitable alarm 56, which may take any desired form, audible, visible or both.

As shown in FIG. 2, which illustrates the device in its standby condition, the springs 34 and 38 are so designed that the chamber 18 is located within the housing 2 with the wall 20 engaged with the stops 23, with the feeler rod 14 substantially completely withdrawn into the housing, with the rod 26 only partially within the coil 28 and with the finger 30 well above the normally closed switch 32. The position of the rod 26 with respect to the coil 28 will cause that coil to have a value of inductance such that energization of the winding 50 will be sufficient to move the normally closed switch 52 to its open position, so that the alarm 56 is not actuated. The timer 48 maintains the circuit to the heater 24 open, and the device assumes its steady state condition.

When a detection step is to be carried out the variable resistor 46 is set to an appropriate value and the timer 48 will close the circuit to the heater 24. The degree to which that heater 24 will be energized is determined by the setting of the resistor 46, the greater the value of that resistance the less the energization of the heater 24. The heater 24 will heat the air or other gas or liquid within the chamber 18 and this will cause that chamber to expand vertically. Because the spring 34 is stronger than the spring 38 the lower wall 20 of the chamber will tend to remain substantially stationary against the stops 23 and the wall 16, along with the feeler rod 14, will tend to move upwardly. The force on the wall 16 tending to move the feeler rod upwardly will be determined by the setting of the resistor 46 and the length of time that the timer 48 keeps the heater circuit closed. If, as shown in FIG. 4, there is no ice on the housing wall 8 the wall 16 will move upwardly, the rod 14 will move freely through the aperture 12 to its projected position, the inductance of the coil 28 will remain essentially the same, and hence the normally closed switch 52 will remain open and the alarm 56 will not be energized.

However, as shown in FIG. 3, if ice 53 is formed on the aircraft skin and hence over the housing wall 8 and across the aperture 12, free movement of the feeler rod 14 to its projected position will be prevented if the thickness of the ice layer 53 is sufficient to withstand the projecting force exerted on the feeler rod 14. As a result, and as shown in FIG. 3, when the chamber 18 is internally heated and expands, since the feeler rod 14 cannot move upwardly, the bottom wall 20 will be forced down against the action of the spring 34, causing the rod 26 to further penetrate the coil 28 and thus increase its inductance. That inductance increase will cause a reduction in the current passing through the switch coil 50, that coil will no longer exert sufficient magnetic force to keep the normally closed switch 52 open, the switch 52 will close, and the alarm 56 will be energized.

All of this will take place in a relatively short period of time, on the order of seconds. Thereafter the timer 48 will open the circuit to the heater 24, that heater will be de-energized, the chamber 18 will cool, and the parts will return to their normal condition shown in FIG. 2.

It may be desired to ensure that the heater 24 is de-energized as soon as the lower wall 20 of the chamber 18 reaches a predetermined position, and to that end the normally closed switch 32 in series in the heater circuit is designed to be opened by the finger 30 when the lower chamber wall 20 has reached that predetermined position.

The tip of the feeler rod 14 is here shown as pointed, in order to assist it in breaking through thin ice layers when that is desired, but that shaping is optional. The minimum thickness of the ice layer 53 which will be detected by the device is determined in large part by the strength of spring 34. A strong spring will cause the rod 14 to penetrate a thin ice layer 53 before the bottom wall 20 moves down enough to actuate the alarm, while with a weak spring such a thin layer will cause the alarm to be actuated. The spring 34 should nevertheless be strong enough to urge the rod 14 upwardly with sufficient force to produce a self-cleaning effect with respect to foreign matter which may enter the aperture 12.

The heat-dissipation elements 25 speed the conduction of the heat produced in chamber 18 through the rod 14 thereby to render the device more rapidly ready to perform its next sensing cycle.

It will be appreciated that the inductance-type sensor here specifically illustrated is but one of a number of types of sensors, all well known in the art, that could be employed, such as capacitors, switches, variable resistors and the like.

Figure 6:
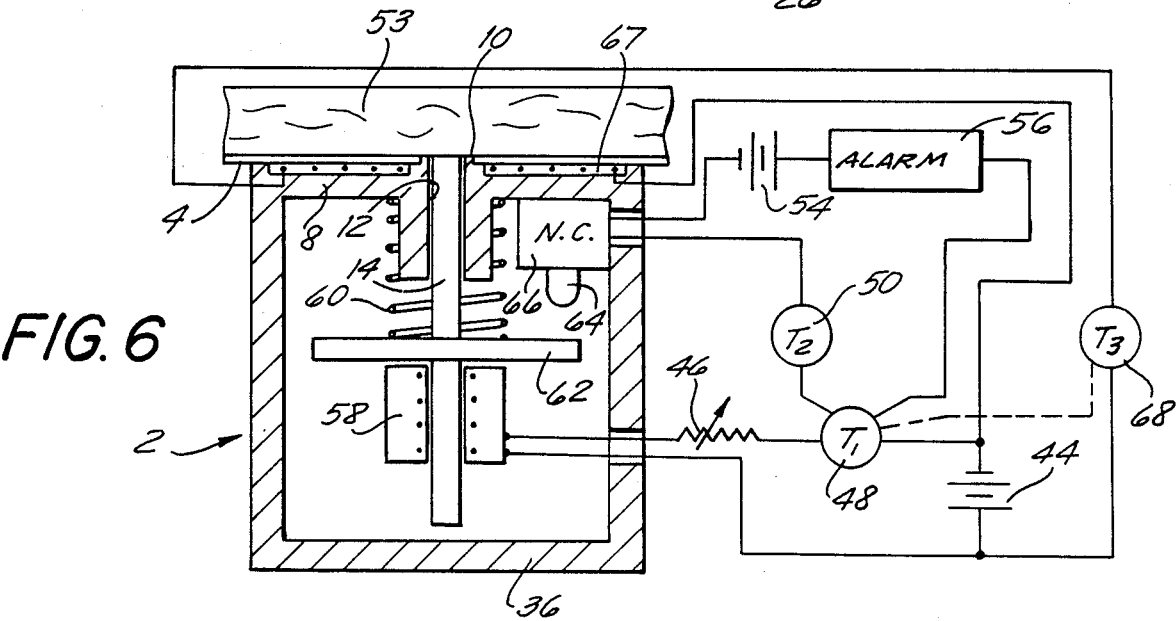
FIG. 6 is a cross-sectional view with simplified electrical circuitry of an alternative embodiment of the present invention, illustrated with ice present and detected.

FIG. 6 illustrates an alternative embodiment in which the projecting force active on the feeler rod 14 is provided by a solenoid 58 connected in series with the battery 44, the timer 48 and the variable resistor 46. The spring 60 is active on the feeler rod 14 to urge it to its retracted position and energization of the solenoid 58 urges the feeler rod 14 upwardly to its projected position. A plate 62 carried by the feeler rod 14 will, when the feeler rod 14 projects upwardly from the housing 2, as will be the case when there is no ice present, engage and push upwardly the operating button 64 of a normally closed switch 66 in series with the battery 54, the alarm 56, and in this case the timer 48 and a second timer 50. When the timer 48 is open-circuited with respect to solenoid 58 it also opens the circuit through the switch 66 so that the alarm 56 is not energized. When the timer 48 closes its circuit to energize the solenoid 58, it also closes the alarm circuit through itself, but the second timer 50 keeps the alarm circuit open for an additional period of time such as to permit the feeler rod 14 to move upwardly if it can and open the normally closed switch 66. It is only after that period of time has passed (on the order of seconds, perhaps) that the timer 50 closes its circuit. Then if the feeler rod 14 is outwardly projected, as will be the case when no ice or insufficient ice has been detected, the opening of the switch 66 will prevent the alarm 56 from being activated. However, if ice 53 has prevented the feeler rod 14 from moving to its projected position the normally closed switch 66 will remain closed, and then, when both the timers 48 and 50 have closed their circuits, the alarm 56 will be energized. After the few seconds have passed which are required for a complete test cycle the timer 48 will open its circuit, the solenoid 58 will be de-energized, the spring 60 will return the feeler rod 14 to its retracted position if it is not already there, and the device will be ready to test again when desired.

If desired, the alarm 56 can, by well known circuitry, lock itself in an alarm condition once it has been actuated, there to remain until manually released.

In the embodiment of FIG. 6 a heater 67 is located adjacent the ice-contacting surface of the housing 2. That heater, under control of timer 68 in turn controlled by timer 48, can be energized at the end of an ice-detecting cycle to melt any ice which might impede return of the feeler rod 14 to its initial position. The heater 67 could, of course, be used in other specific embodiments of my invention.

The illustrated electrical circuitry is designed for automatic initiation of ice-detection sequences at a predetermined time schedule. Obviously manual control, either supplementing or supplanting automatic control, could be provided, and means can also be provided to actuate the automatic system only when desired, as when potential icing conditions ar encountered.

It will be appreciated from the above that the device of the present invention is an effective and reliable ice detector with great flexibility of function. It can perform its ice detection cycle as frequently or infrequently as desired, it can readily be designed to detect only a desired degree of ice formation, and its entire ice detection cycle involves projecting the feeler rod only for a few seconds during each cycle and not at all in the intervals between cycles. The system is fail-safe in operation, and it consumes but a minimal amount of power.

It will be apparent that many variations may be made in the specifics of the structures and systems here disclosed, all without departing from the spirit of the invention as defined in the following claims.

I claim:

1. An ice detector comprising a housing adapted to be mounted adjacent a location where the presence or absence of ice is to be detected, said housing having an aperture opening to said location, a feeler within said housing having a part movable through said aperture to a first position extending from said housing but normally in a second position retracted relative to said first position, driving means in said housing operatively connected to said feeler and active when actuated to urge said feeler to its first position, and detector means sensitive to the position of said feeler to indicate the presence or absence of ice at said location pursuant to whether said feeler is in its second or first position respectively after said driving means has been activated.

2. In the ice detector of claim 1, means for periodically actuating said driving means.

3. The ice detector of either of claims 1 or 2, in which said driving means comprises a temperature-expansible member and means for heating said member, said driving means being actuated by electrically energizing said heating means.

4. The ice detector of claim 3, in which said temperature-expansible member comprises a fluid-filled container having relatively movable first and second parts, said feeler being operatively connected to said first part, said second part being operatively connected to said detector means.

5. The ice detector of claim 4, further including means for sensing the movement of said second part to a predetermined position within said housing and de-energizing said heating means in response thereto.

6. The ice detector of claim 3, in which said temperature-expansible member comprises a fluid-filled container having relatively movable first and second parts, said feeler being operatively connected to said first part, said second part being operatively connected to said detector means, movement of said feeler to its said first position and consequent movement of said first part therewith preventing said second part from actuating said detector means in response to actuation of said heating means, said first part remaining substantially in its said second position when ice is detected and said second part then moving to actuate said detector means in response to actuation of said heating means.

7. The ice detector of claim 6, further including means for sensing the movement of said second part to a predetermined position within said housing and de-energizing said heating means in response thereto.

8. An ice detector comprising a housing adapted to be mounted adjacent a location where the presence or absence of ice is to be detected, said housing having an aperture opening to said location, a feeler within said housing having a part movable through said aperture to a first position extending from said housing but normally in a second position retracted relative to said first position, a substantially closed chamber in said housing having first and second parts connected by an expansible wall, said feeler being operatively connected to said first part, first resilient means active on said chamber for supporting said chamber in said housing, second resilient means active on said first part for normally urging said feeler to its said second position, heating means active on said chamber effective when actuated to cause said first and second parts to separate, and detector means operatively connected to said second part and effective when said second part is moved to a given position to indicate the presence of ice at said aperture.

9. In the ice detector of claim 8, means for periodically actuating said heating means.

10. In the ice detector of claim 8, means for sensing the movement of said second part to a predetermined position within said housing and de-energizing said heating means in response thereto.

11. In the ice detector of claim 10, means for periodically actuating said heating means.

12. The ice detector of any of claims 8–11, in which said chamber comprises a fluid-filled bellows-like means and said heating means is an electrical heater located in effective heat-transmissive relationship with the interior of said chamber.

13. In the ice detector of either of claims 1 or 8, heater means on said housing adjacent said aperture, and means for actuating said heating means after said driving means has been actuated and said detector means has performed its indication.

* * * * *